United States Patent
Klotz et al.

(10) Patent No.: US 12,088,642 B2
(45) Date of Patent: *Sep. 10, 2024

(54) PROCESS AND COMPUTER FOR ESTABLISHING DATA TRANSMISSION

(71) Applicant: Drägerwerk AG & Co. KGaA, Lübeck (DE)

(72) Inventors: Tobias Klotz, Lübeck (DE); Clément Ledoux, Lübeck (DE)

(73) Assignee: DRÄGERWERK AG & CO. KGAA, Lübeck (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/465,283

(22) Filed: Sep. 12, 2023

(65) Prior Publication Data

US 2023/0421619 A1    Dec. 28, 2023

Related U.S. Application Data

(63) Continuation of application No. 17/844,962, filed on Jun. 21, 2022, now Pat. No. 11,856,036.

(30) Foreign Application Priority Data

Jun. 22, 2021  (DE) .......................... 102021116085.5

(51) Int. Cl.
  *H04L 65/1073*  (2022.01)
  *H04L 41/12*  (2022.01)
  *H04L 65/1101*  (2022.01)

(52) U.S. Cl.
  CPC .......... *H04L 65/1073* (2013.01); *H04L 41/12* (2013.01); *H04L 65/1101* (2022.05)

(58) Field of Classification Search
  CPC ... H04L 65/1073; H04L 65/1101; H04L 41/12
  See application file for complete search history.

(56) References Cited

U.S. PATENT DOCUMENTS

| | | | |
|---|---|---|---|
| 11,196,807 B1 * | 12/2021 | Chen | H04L 41/5058 |
| 2003/0105846 A1 * | 6/2003 | Zhao | H04L 67/55 709/219 |
| 2021/0136846 A1 * | 5/2021 | Ponnusamy | H04W 4/80 |
| 2021/0312001 A1 * | 10/2021 | Bao | G06F 16/245 |

* cited by examiner

*Primary Examiner* — Chris Parry
*Assistant Examiner* — Steven C Nguyen
(74) *Attorney, Agent, or Firm* — McGlew and Tuttle, P.C.

(57) ABSTRACT

A process and a computer establish a data transfer from a provider (1, 2) that provides data to a consumer (9) that uses the data. A consumer (9) transmits a request message (probe) for requested data to a communications agent (5). In response, the communications agent (5) adds an entry for the request message (probe) to a requests list (AL). Subsequently, a provider (1, 2) transmits a registration message (Hello) to the communications agent (5). The communications agent (5) searches the requests list (AL) for an entry for a request message (probe) that matches the received registration message (Hello). If a matching entry is found in the requests list (AL), the communications agent (5) initiates a data transfer from the provider (1, 2) to the consumer (9).

15 Claims, 8 Drawing Sheets

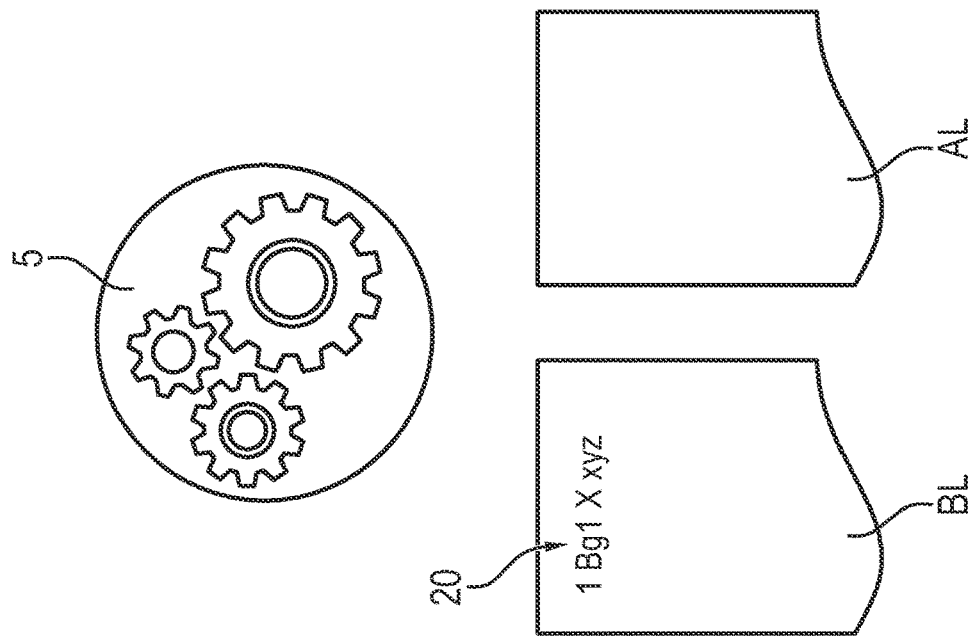
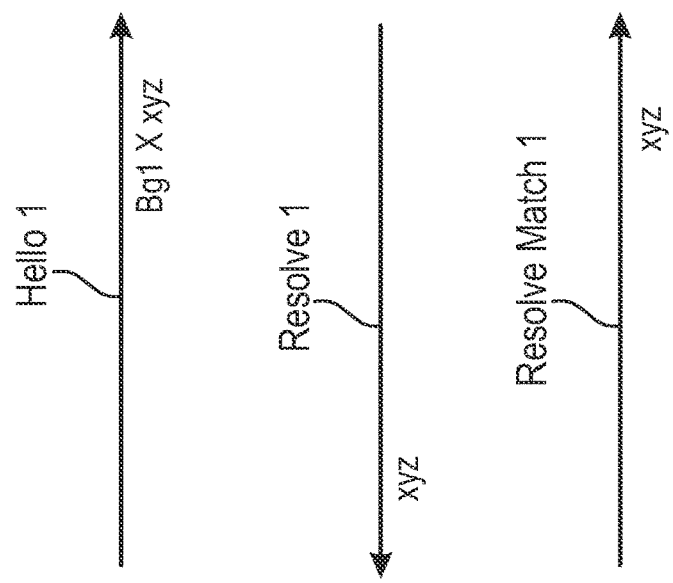
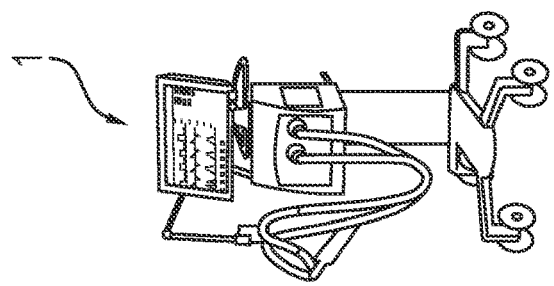
FIG. 3

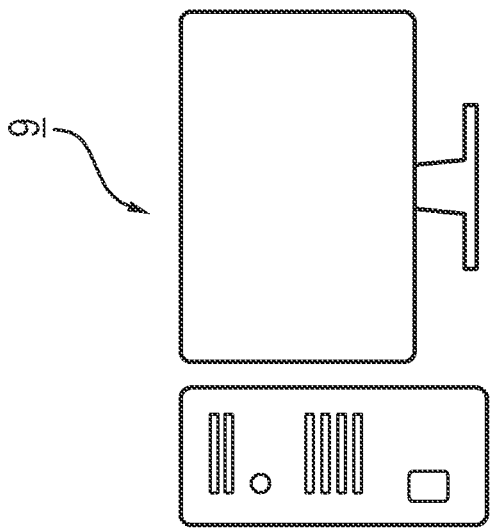
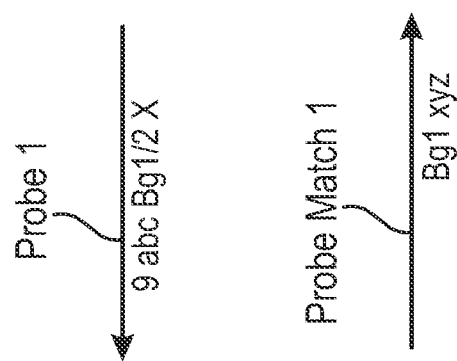
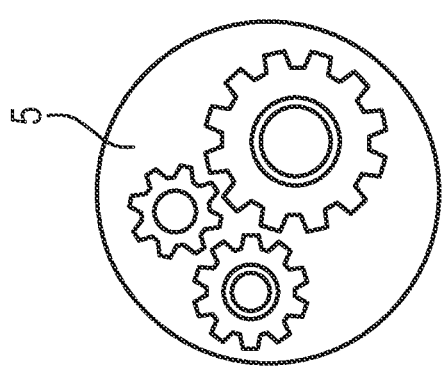
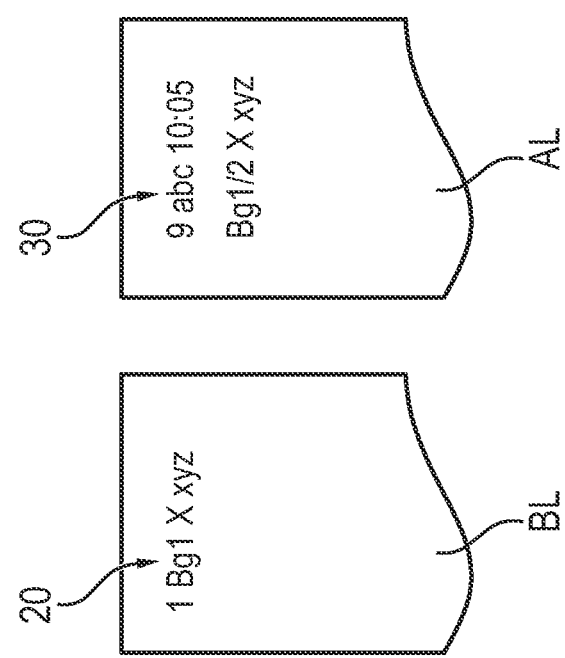
FIG. 4

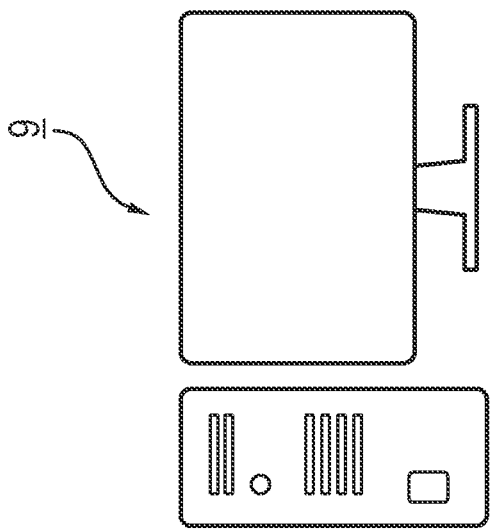
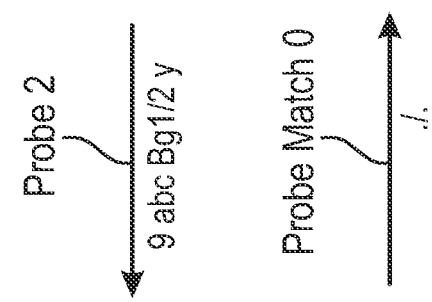
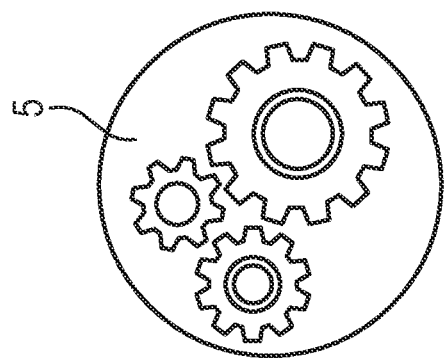
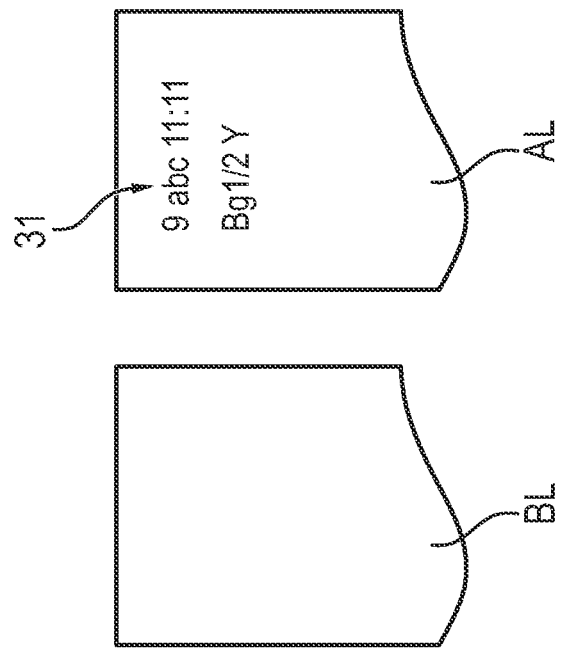
FIG. 6

US 12,088,642 B2

PROCESS AND COMPUTER FOR ESTABLISHING DATA TRANSMISSION

CROSS REFERENCE TO RELATED APPLICATIONS

This application is a continuation of, and claims the benefit of priority under 35 U.S.C. 120 of, U.S. application Ser. No. 17/844,962 filed Jun. 21, 2022, which claims the benefit of priority under 35 U.S.C. § 119 of German Application 10 2021 116 085.5, filed Jun. 22, 2021, the entire contents of which are incorporated herein by reference.

TECHNICAL FIELD

The invention relates to a process and computer (computing device) for an arrangement, the arrangement comprising a plurality of data processing devices and at least one data network (hereinafter the one or more data network of the arrangement is referred to as the data network configuration), each data processing device being connected or at least temporarily connectable to data network configuration. At least one connected device (a provider) is adapted to provide data, and at least one other connected device (a consumer) is adapted to use that data. The process and the computer are adapted to automatically establish at least one data transfer in said arrangement, wherein after establishing the data transfer, data is transferred or at least can be transferred (is transferable) from a provider to a consumer.

TECHNICAL BACKGROUND

The process and computer according to the invention can be used, for example, in a hospital. Connected medical devices, for example ventilators or patient monitors, are able to collect data and operate as providers. Other connected devices are able to use this data, for example to display, evaluate or store it in a form that can be perceived by a human being, and operate as consumers. "Using" data in the sense of the invention may include at least one of the following steps:
  evaluate or otherwise process the data,
  search the data for specific data records, temporal sequences or correlations, or
  output the data or a context found in the data in a form that can be perceived by a human being, in particular visually.

In order for a device to use data provided by another device, the data must be transmitted from the providing device to the using device, over a point-to-point connection or over a data network connecting more than two devices. The invention is used for a data network in which different connected devices have different network addresses. Transmission from a providing device to a using device requires that one device know the network address of the other device. Often, however, not all devices are constantly connected to data network configuration, but only intermittently at a time. In many cases, therefore, it is often not known in advance when a using device will request data and which other device will be able to provide this requested data and when. It is often not even known which providers are currently connected to the data network configuration of the arrangement. It is possible that multiple other devices can provide this data.

An approach that enables data transmission despite these limitations includes the steps of the using device generating a request, sending that request into the data network or each data network, and each device capable of providing the requested data sending a response to the request into the data network or each data network. This procedure, i.e., a type of broadcasting, already requires a relatively large amount of data traffic before consumer data, i.e., the requested data, can be transmitted.

The "OASIS Web Services Dynamic Discovery (WS-Discovery)" standard specifies a "multicast discovery protocol" to locate services in a local computer network. According to this standard, messages are transmitted according to SOAP (simple object access protocol), using the protocols "TCP" and "UDP" and using "UDP port 3702" and "IP multicast addresses" and "SOAP-over-UDP".

In US 2003/0 105 846 A1 an arrangement with a consumer 314, a service provider 208 and a UDDI (universal, description, discovery and integration) server 302 is described. The service provider 208 may register a service 306 with the UDDI server 302 using a "register interface 312". The UDDI server 302 stores the registered services 306 in a database 304. The consumer 314 may make a request ("request") for a service 306 to the UDDI server 302 using a "discover interface 316". The UDDI server 302 searches the database 304 for at least one, preferably any, matching service 306. If a matching and available service 306 is found, the consumer 314 is notified thereof via a "notification interface 318". If no matching service 306 is found, or if a matching service 306 that is found is not currently available, the unmet request is stored in the database 304. The database 304 is searched periodically. If a matching service 306 becomes available or a matching service 306 is registered and available, the consumer 314 is notified thereof.

SUMMARY

It is an object of the invention to provide a process and device (computer), wherein the process and device (computer) are able to establish at least one data transfer from one device to another device, and wherein the establishment of the data transfer requires less data traffic than known process and computers.

The object is attained by a process of establishing a data connection having features according to the invention and by a device having features according to the invention. Advantageous embodiments are disclosed herein. Advantageous embodiments of the process according to the invention are, as far as useful, also advantageous embodiments of the device (computer) according to the invention and vice versa.

A "computer" is understood to be any device that is capable of automatically receiving, processing and, depending on the processing, transmitting and/or outputting signals, messages and/or other data.

The process according to the invention and the computer (device) according to the invention are configured to automatically set up at least one data transmission in an arrangement. This arrangement comprises a data network configuration that comprises at least one data network, preferably a plurality of interconnected data networks. Messages and data can be transmitted in the data network configuration. At least one data processing device is connected to the data network configuration or can be connected at least temporarily.

At least one connected or connectable device operates at least temporarily as a provider of data. At least one other connected or connectable device operates at least temporarily as a consumer of data. It is possible that the same device operates as a provider at times and as a consumer at times. It is also possible that the same device operates as a provider of a first amount of data and as a consumer of a second amount of data in the same time period or in two overlapping time periods.

Each data processing device that is connected or connectable to the data network configuration of the arrangement has a network address. This network address distinguishes this device from any other device that is connected or connectable to the data network configuration of the arrangement. Thus, the network address uniquely identifies the device within the arrangement. The network address of a device is used to send a message to that device.

The data transmission is set up with the goal that data is or at least can be transmitted from a provider to a consumer. In one alternative of the invention, a consumer uses the network address of a provider to request required data from that provider. In another alternative, a provider uses the network address of a consumer to transmit data to that consumer.

The process according to the invention is carried out using a communications agent (which may also be referred to as a communications mediator or communications intermediary). The device (computer—data network device with processing unit) according to the invention is configured to operates at least temporarily as a communications agent. Preferably, the communications agent is a software program ("proxy") which can be executed on a computer (on a data network device such as data network computer), for example on the computer according to the invention or also on another computer. The software program is stored on a computer readable medium/computer readable media (the software is provided on a non-transient, tangible medium (or media)) with a program code for carrying out all or some of the process when the program code is executed on a computer, on a processor (processing unit) or on a programmable hardware component. The computer (computer device or data network device with processing unit) on which the communications agent is executed is at least temporarily connected to the data network or at least one data network, preferably to each data network, of the arrangement. Thus, it is directly or indirectly connected or connectable to any other data processing device of the arrangement. The communications agent may also be implemented by means of hardware, for example by means of a signal processing unit (such as with a signal or data processing unit of a data network device).

The communications agent also has a unique network address. Every other device that is connected or connectable to the data network configuration knows the network address of the communications agent.

According to the invention, a request message is transmitted at least once from a consumer to the communications agent. It is possible that different request messages originate from the same consumer or from different consumers and are transmitted to the communications agent.

The request message or each request message includes a computer-evaluable data specification of the particular data requested and the unique network address of the consumer from which that request message originated. The data specification includes, for example
 a definition of the type of device from which the provider should be,
 a definition of a location where the provider should be located, and/or
 a determination of a period during which, in accordance with the determination, such data was collected.

The data specification can additionally specify a maximum amount of data and/or achievable transmission rate and/or a priority and/or a data security and/or a confidentiality of the data. Of course, two different consumers may each transmit a request message specifying the same data. The two request messages may be completely the same or may differ with respect to some other specification.

The communications agent has read and write access to a computer-evaluable requests list—more precisely: to the requests list in a data memory in which the requests list is stored. It is possible that this requests list is empty at the beginning of the procedure, i.e. has no entry. In response to the communications agent having received a requests message from a consumer, the communications agent adds an entry to the requests list for the received requests message. This entry in the requests list includes the data specification and the network address of the consumer, where the data specification and the network address have been transmitted as part of the request message.

The requests list thus contains a list of requests for data received by the communications agent. The process under the communications agent is configured so that a consumer registers with the communications agent to be informed about at least one provider of matching data.

According to the invention, a registration message (also referred to as a login message) is further transmitted at least once from a provider to the communications agent. It is possible that registration messages from different providers are transmitted to the communications agent. It is also possible that several registration messages are transmitted successively from the same provider to the communications agent, for example because the provider is able to provide different data successively, has been switched off or disconnected from the data network in the meantime, or because a specified period of time has elapsed since the first registration message.

The registration message or each registration message includes information that this provider is now connected to the data network configuration. It is also possible that the communications agent uses the arrival of the registration message as such information as well. Further, the registration message or each registration message includes a provider specification, such as.
 a specification of the device type and/or
 a specification of where this provider is currently located and/or what data the provider is currently capable of providing,
 optionally with what maximum data volume and/or maximum achievable transmission rate it is able to do this, and/or
 in what status the provider is currently.

Further, the registration message includes the unique network address of the provider. Two different registration messages from the same provider may include different provider specifications. Conversely, registration messages (login messages) from different providers may include the same provider specification.

The process of the communications agent receiving a registration message triggers the following step: The communications agent searches the requests list for at least one entry that matches the received registration message. An entry in the requests list matches a registration message if the data specification of that entry is compatible with the provider specification in the registration message. "Be compatible" means the following: according to the provider specification, the provider from which the registration message originates, is able to provide the data that is requested according to the data specification. The communications agent searches the requests list for at least one matching entry. Preferably, the communications agent searches for each matching entry in the requests list.

If the communications agent has found at least one matching entry in the requests list, i.e. an entry whose data specification matches the provider specification of the registration message, the communications agent shall set up or at least prepare to set up a data transfer from the provider to the consumer. The received registration message determines which provider provides the matching data, and the matching entry in the requests list determines which consumer originated the request message that led to the entry, i.e., which consumer requested that data.

The data transmission setup includes at least one of the following two steps:
  The communications agent triggers the step that a mediation message is transmitted to the consumer. This mediation message includes the network address of the or one provider with the matching provider specification, i.e. the network address of the provider that can provide the requested data.
  The communications agent triggers the step that a mediation message is transmitted to the provider. This mediation message includes the network address of the consumer from which the matching data specification originates, i.e. the network address of the consumer that requested the provided data.

The data transmission setup may include both steps, providing redundancy in many cases. However, one step alone is usually sufficient to initiate data transmission.

The communications agent may find several entries when searching for an entry whose data specification matches the provider specification of the received registration message. If these entries in the requests list belong to request messages from at least two different consumers, then preferably in one alternative a mediation message is transmitted to each consumer with the network address of the same matching provider. In another alternative, a mediation message is transmitted to the provider comprising the respective network address of each consumer with a matching entry, i.e., at least two different network addresses. These two alternatives can be combined, especially to reduce the risk of errors by redundancy.

According to the invention, only three messages are required to set up and thereby enable a data transfer from a provider to a consumer, viz.
  the request message from the consumer,
  the registration (login) message from the provider and
  the mediation message with the network address of the provider or the consumer to the consumer or the provider.

The first two messages are transmitted to the communications agent, and the third message is sent by the communications agent.

These three messages can be transmitted using at least one relatively secure transmission protocol, e.g. via TCP HTTPS and/or "Transport Layer Security" (TLS).

The use of a secure transmission protocol reduces the risk of data being manipulated or queried without authorization, or of malware being sent. These three messages do not necessarily contain consumer data, i.e., requested or provided data. As a result, the three messages generally require relatively little storage capacity and can be transmitted relatively quickly.

In particular, thanks to the invention, it is not necessary for a consumer to send a request message into a data network in an undirected manner and for the sent message to be transmitted to a plurality of devices that may be providers or even to all devices of the arrangement. Further, it is not necessary for a provider to send a registration message in an undirected manner into a data network and for that sent registration message to be transmitted to a plurality of devices that may be consumers or even to all devices of the arrangement. This is because the undirected sending would result in significantly greater data traffic. With undirected sending, there is a greater risk that a device in the arrangement or another device will manipulate or query data without authorization or feed in malicious software.

In the arrangement with the at least one data network, often not all devices are permanently connected to the data network configuration, but only intermittently. Otherwise, they are switched on but not connected to a data network, for example, because a device is moved from one location to another location. In addition, the provider specification of a provider may change over time, for example because the same provider is operated successively for different uses and/or in different modes of operation and/or in different locations and/or in different states. It is also possible that a provider or consumer is subsequently added to the arrangement. In particular, it is possible that a suitable provider is connected to the data network configuration after a consumer has sent a request message. In this situation, the invention also allows for data communication to be established between the provider and the consumer.

Thanks to the invention, it is not necessary for a consumer who needs certain data and therefore generates a corresponding request to continuously transmit this request to potential providers. Furthermore, thanks to the invention, it is not necessary for the consumer to have read access to a central table, which is to be kept up to date on an ongoing basis, in which all those potential providers and their respective network addresses are noted that are currently connected to the data network configuration. Both conceivable embodiments would result in significantly greater data traffic than the invention. This is because the table must be kept up to date and may still be out of date. Thanks to the invention, it is sufficient that each provider and each consumer knows the network address of the communications agent, plus of course their own network address. The communications agent transmits to a consumer and/or a provider the required network address of another device.

Despite this constraint, the invention allows the requested data to be transmitted from a provider capable of providing that data to the consumer as soon as the request is received by the communications agent and the provider is connected to the data network configuration.

According to the invention, the communications agent collects incoming request messages from consumers in the requests list. As soon as a provider registers by transmitting a registration message from this provider to the communications agent, the communications agent searches the requests list for entries, i.e. for possibly open requests, to which the provider specification of the provider who has just registered matches. Thus, according to the invention, the step of initiating a data transfer from the provider to the consumer is triggered by the provider logging in.

If a request message from a consumer is received first and then a registration message from a provider is received by the communications agent, data transmission is initiated when the provider has also registered. According to the invention, data transmission is not necessarily initiated by a consumer transmitting a request message. It is possible that at the time the request message arrives at the communications agent, no matching provider is connected to the data network configuration.

The invention eliminates the need to establish and keep current a table in advance, which table includes each data-processing device currently connected to the data network configuration of the arrangement and its respective network address. Rather, the communications agent receives the registration messages from the devices that will be connected to the data network configuration.

According to the invention, the communications agent adds an entry for a request message to the requests list in response to the communications agent receiving the request message. Thus, the received request message is stored in the requests list regardless of whether or not a provider is currently available that is capable of providing the data specified in the request message. This avoids case discrimination. Furthermore, thanks to the invention, it is possible to implement the following procedure:

A provider transmits an initial registration (login) message to the communications agent.

Subsequently, a consumer transmits a request message to the communications agent. The request message matches the first registration message. A corresponding first mediation message is transmitted to the provider and/or to the consumer.

Subsequently, the same or a different provider transmits a second registration message to the communications agent. The request message also matches the second registration message. A corresponding second mediation message is transmitted to the provider and/or to the consumer.

This process could not be realized if only unfulfilled request messages were stored in the requests list.

It is possible for the communications agent to successively receive at least two different request messages from the same consumer, wherein these two request messages comprise two matching data specifications or at least two data specifications with an intersection of requested data. At a minimum, if the communications agent has received a temporally later request message before generating and sending a mediation message in response to the temporally earlier request message, the communications agent preferably deletes the entry for the temporally earlier request message from the requests list. This embodiment reduces the risk that two matching mediation messages are transmitted unnecessarily.

According to the invention, in response to having received a request message, the communications agent generates an entry in the requests list for that request message. If a provider is able to provide this requested data automatically and has registered with the communications agent, the communications agent generates a mediation message and triggers a process in which this mediation message is transmitted to the consumer and/or to the provider.

In one embodiment, the communications agent then additionally deletes the entry for the request message from the requests list. This is because a suitable provider has now been found for this request. In another embodiment, the entry remains in the requests list. It is possible that another provider will later also be able to provide data that matches the request message.

According to the invention, the communications agent has read and write access to the requests list. It is possible that the communications agent only sets up a data transfer if the communications agent has first received a request message and then a matching registration message. This embodiment may be combined with the implementation form that a provider periodically transmits a further registration message to the communications agent, the further registration message comprising information that the provider is still connected to the data network configuration.

In a preferred embodiment, however, it is sufficient for each provider to transmit a single registration message to the communications agent while connected to the data network configuration. According to this preferred embodiment, the communications agent additionally has read and write access to a computer-evaluable providers list—more specifically, to the providers list in a data store in which the providers list is stored. This providers list includes one entry for each provider that logs on to the data network configuration of the arrangement. The communications agent creates this entry in the providers list as soon as the communications agent has received a registration message from this provider. The entry for a provider includes its unique network address and the provider specification, both of which have been transmitted as components of the registration message from the provider to the communications agent. The communications agent thus collects information in the providers list about the providers who have logged on to the data network configuration and have therefore transmitted a registration message (login message) to the communications agent.

According to this embodiment, the step of the communications agent receiving a request message from a consumer triggers the following step: The communications agent searches the providers list for at least one entry that matches the received request message. An entry in the providers list matches the received request message if the provider specification of the entry in the providers list is compatible with the data specification of the request message.

If the communications agent has found at least one matching entry in the providers list, the communications agent initiates a data transfer from the provider to which this entry in the providers list refers to the consumer from which the request message originates. The communications agent initiates the data transfer by performing at least one of the following two steps:

The communications agent transmits a mediation message to the consumer. This mediation message includes the network address of the provider to which the matching entry in the providers list refers.

The communications agent transmits a mediation message to the provider. This mediation message includes the network address of the consumer from which the request message with the matching data specification originates.

It is possible that the communications agent finds several matching entries in the providers list. In a preferred embodiment, the communications agent transmits to the consumer a mediation message comprising the respective network address of each provider with a matching entry in the providers list. In another embodiment, the communications agent transmits to each provider a respective mediation message comprising the network address of the requesting consumer.

The configuration with the providers list in addition to the requests list covers the following two possibilities in particular:

At the time a consumer requests certain data and therefore transmits a request message to the communications agent, at least one provider capable of providing that data is already connected to the data network configuration, and therefore the providers list includes an entry for that provider. In this case, the communications agent initiates the data transfer as soon as the request message arrives from the consumer. The communications agent finds at least one matching entry in the providers list and initiates a data transfer from the provider to which this entry refers to the requesting consumer.

It is true that the requests list contains an entry for the consumer's requests message. However, at the time the consumer requests this data, no provider capable of providing this data is connected to the data network configuration. In this case, the communications agent initiates the data transfer later, as soon as a registration message arrives from a provider capable of providing this data. The communications agent finds at least one matching entry in the requests list and initiates a data transfer from the provider from which the registration message originates to the consumer to which the matching entry in the requests list refers.

In a preferred further development of the configuration with the providers list, the communications agent keeps the providers list continuously up to date. For this purpose, the communications agent repeatedly triggers the step of transmitting a status request to the provider to which the entry refers for each entry in the providers list, for example at regular intervals. For this purpose, the communications agent preferably uses the unique network address in the entry for that provider. The communications agent checks whether a status response is received by the communications agent from a requested provider within a specified period of time. If this is not the case, the communications agent prefers to delete the entry for this provider from the providers list. In an alternative, the communications agent deletes the entry for a provider only when n status queries do not each result in a response in the time period, where n>=2. This embodiment reduces the risk that a provider is deleted from the providers list only because a single status request or a single status response does not reach its respective destination, even though the provider is still connected to the data network configuration.

According to the invention, the communications agent initiates a data transmission from a provider to a consumer. Typically, data is then actually transmitted from the provider to the consumer. The invention enables, but does not require, a message to be transmitted to the communications agent as to whether the requested data has actually been transmitted.

It is possible that the provider is switched off again and/or disconnected from the data network configuration after transmission of the mediation message. It is also possible that a provider is switched off again and/or disconnected before it has provided data, or at least before the requested data has been completely transmitted.

In one embodiment, an unsubscribe (logout) message from a provider that is no longer connected to a data network of the arrangement is transmitted to the communications agent. This unsubscribe message comprises the network address of the provider from which the unsubscribe message originates and information that this provider is now no longer connected to the data network configuration of the arrangement. In particular, the communications agent may respond to receipt of the unsubscribe message as follows:

The communications agent deletes the entry for this provider from the providers list.

The communications agent triggers the step of transmitting an unsubscribe message to at least one consumer registered in the requests list. This unsubscribe message includes the network address of the provider from which the unsubscribe message to the communications agent originated, and optionally a timestamp for when the communications agent received the unsubscribe message.

These two embodiments can be combined.

In a further variant of this embodiment, the communications agent forwards this unsubscribe message to each consumer for which there is at least one entry in the requests list, i.e., to each consumer that has submitted at least one requests message to the communications agent.

In another embodiment, the communications agent forwards the unsubscribe message only to those consumers who have previously received a mediation message with the network address of that provider. In order to be able to forward the unsubscribe message only to such consumers, the communications agent stores assignment (mapping) information according to this other embodiment. Such assignment information specifies an assignment of a provider to a consumer, where the provider specification in that provider's registration message matches the data specification in that consumer's request message, and therefore the communications agent has triggered a data transfer from the provider to the consumer. Preferably, this assignment information is stored regardless of whether the consumer actually transmits a request to the provider and/or, conversely, the provider transmits data to the consumer. Assignment information is stored when the communications agent has found a matching entry in the requests list in response to receiving a registration message and has sent a mediation message as a result. Assignment information is also stored if, in response to receiving a request message, the communications agent has found a matching entry in the optional providers list and thereupon sent a mediation message.

Upon receipt of the unsubscribe message from the provider, the communications agent searches the assignment information for any assignment information in which that provider is named. The communications agent identifies each consumer to which that provider has transmitted data—more specifically, each consumer to which the communications agent has initiated a data transmission from that provider. The communications agent transmits to each identified consumer a respective unsubscribe message that includes the network address of the provider.

In one implementation form, the assignment information is stored in the requests list. As already described, the communications agent generates an entry in the requests list for each received request message. This entry includes the data specification and the network address of the consumer. According to this form of implementation, as soon as the communications agent has found a registration message with a matching provider specification or has found an entry in the providers list with a matching provider specification, the communications agent adds the respective network address of the provider or each provider found to the entry in the requests list. In another form of implementation, the assignment information takes the form of a separate table.

According to the invention, in response to having received a request message, the communications agent generates an entry in the requests list for this request message. Preferably, each entry in the requests list is deleted again after some time. According to this embodiment, therefore, each entry in the requests list that is generated in response to receipt of a requests message comprises at least one timestamp, respectively. If an entry in the requests list comprises a timestamp, then preferably this entry is deleted from the requests list again when a predetermined storage time period has elapsed since the timestamp. Particularly preferably, the entry remains in the requests list until the end of the storage time period, even if a matching registration message was found within the storage time period.

In a preferred first alternative, this timestamp identifies the time at which the communications agent received the request message and subsequently generated the entry in the requests list.

In a second alternative, this timestamp identifies the time at which the communications agent has found a provider with a matching provider specification. As explained above, this triggers the step of transmitting a mediation message. In the second alternative, this point in time is, for example, the point in time at which the communications agent has received a registration message with a matching provider specification or has found an entry with a matching provider specification in the providers list. It is also possible that each entry in the requests list includes two timestamps for the two points in time just described.

A storage time period is specified. This storage time period is specified, for example, by a maximum permissible time period in which a consumer can wait for the requested data. The communications agent then deletes an entry from the requests list if at least the storage time period has elapsed since the time that the timestamp or a timestamp of the entry identifies. It is possible that a data transfer from the provider to the consumer is terminated. It is even possible that the data transfer is started after this entry has been deleted from the requests list.

According to the invention, when a data specification matches at least one provider specification, the communications agent triggers the step of transmitting a mediation message to the consumer or to the provider or each provider. At least two alternatives are possible as to what happens to this mediation message.

In an alternative, this mediation message is transmitted to the consumer and includes the respective network address of each provider with a matching provider specification. The consumer then requests data from the provider or at least one provider whose network address is named in the received mediation message.

In another alternative, this mediation message is transmitted to the provider or at least one provider or even each provider with a matching provider specification and includes the network address of the consumer with the matching data specification. The provider or one provider or each provider then transmits the requested data to the consumer whose network address is identified in the received mediation message.

These two alternatives can be combined.

In one application of the invention, the provider or at least one provider is a medical device, in particular a ventilator or an anesthesia device or a patient monitor, wherein the medical device is temporarily connected or connectable to a patient, or a device of a stationary infrastructure that provides medical gases or other fluids or electrical power or data communication for medical devices or light for a medical workstation. The data that this medical device is capable of providing includes, in particular, variable vital signs of the patient and, in one embodiment, operating parameters of the medical device, for example, operating parameters of artificial respiration or anesthesia or a status parameter. For example, a device that is part of a stationary infrastructure in a hospital provides data about the fluids or other resources provided or consumed and about possible malfunctions. The consumer or at least one consumer is a display device that is capable of outputting data from a medical device and/or an infrastructure device in a manner that can be perceived by a human, in particular visually displayed on a screen.

In some cases, a provider is a device that can be used successively in different locations and connected to the data network configuration of the arrangement. For example, a medical device can be used sequentially in different rooms of the same hospital or even in different hospitals. A consumer requests data from a provider that is currently located in a particular location. For example, the data is to come from a particular room in a building or from a particular bedside or from a particular patient. In particular, in many cases, the data is to come from a medical device that is currently connected to a particular patient.

According to one embodiment, therefore, the data specification comprises, in at least one request message, a specification that specifies the following:
- a location where the provider of the requested data is to be located, in particular a specification of a room in a building or
- a hospital bed or
- a particular patient.

At least one registration message, according to one embodiment, specifies the following:
- a location where the provider from which this registration message originated is currently located, or
- a hospital bed at which the provider in the form of a medical device is currently located, or
- a patient or even a device of stationary infrastructure to which this medical device is currently connected.

For example, both the request message and the registration message each include an identifier of a patient to whom the provider is to be connected or is actually currently connected according to the specification. In particular, the location specification may specify a room in a building or a particular hospital bed or patient. This embodiment ensures that the transmitted data originates from a provider at a pre-specified location.

In one embodiment, the respective data specification of at least one request message comprises an identifier of a measurable physical quantity. This specifies that the consumer who transmitted this request message requires a measured value or measured range of values of this physical quantity. If the invention is used in a hospital, the physical quantity is, for example, a vital sign of a patient or a parameter specifying the provision of a resource, for example, a measured volume flow of a provided fluid or a measured concentration of a constituent of a fluid, in particular, the concentration of a gas constituent in a gas mixture. According to this embodiment, the respective provider specification comprises, in at least one notification message, an identification of a physical quantity that the provider from which this notification message originates is capable of measuring or has measured.

In one embodiment, the process and computer (computer device) according to the invention are used in a hospital. A provider in the sense of the claims is capable of performing a medical treatment on a patient, such as artificially ventilating the patient. Or the provider is capable of measuring a vital sign of the patient, such as a parameter correlated to the patient's own ventilatory activity or cardiac activity or a property of the patient's blood. Or the provider is able to provide a resource, such as a fluid. This resource is used by a device that provides medical treatment to a patient, or assists in the treatment of a patient, or measures vital signs of the patient. A consumer in the sense of the claims is able to output data from such a provider in a form perceivable by a human, in particular graphically.

Particularly in a hospital, high demands are often placed on data security. The invention makes it possible to meet these requests in many cases.

In the following, the invention is described by means of embodiment examples. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a schematic view showing how an initial provider registers (logs in) with the proxy (the communications agent) and how the proxy verifies that the providers list is up to date;

FIG. 4 is a schematic view showing how a consumer transmits an initial request message to the proxy and how the proxy then finds a matching entry in the providers list, transmits a mediation message to the consumer, and completes the requests list;

FIG. 6 is a schematic view showing how the consumer transmits a second request message to the proxy and how the proxy then completes the requests list and transmits an error message to the consumer;

DESCRIPTION OF PREFERRED EMBODIMENTS

In the embodiment example, the invention is used in a hospital. In the hospital, a plurality of devices are used that provide data and a plurality of devices are used that use the data. A device that provides data is hereinafter referred to as a provider. A device that uses data is referred to in the following as a consumer.

Figure 1:
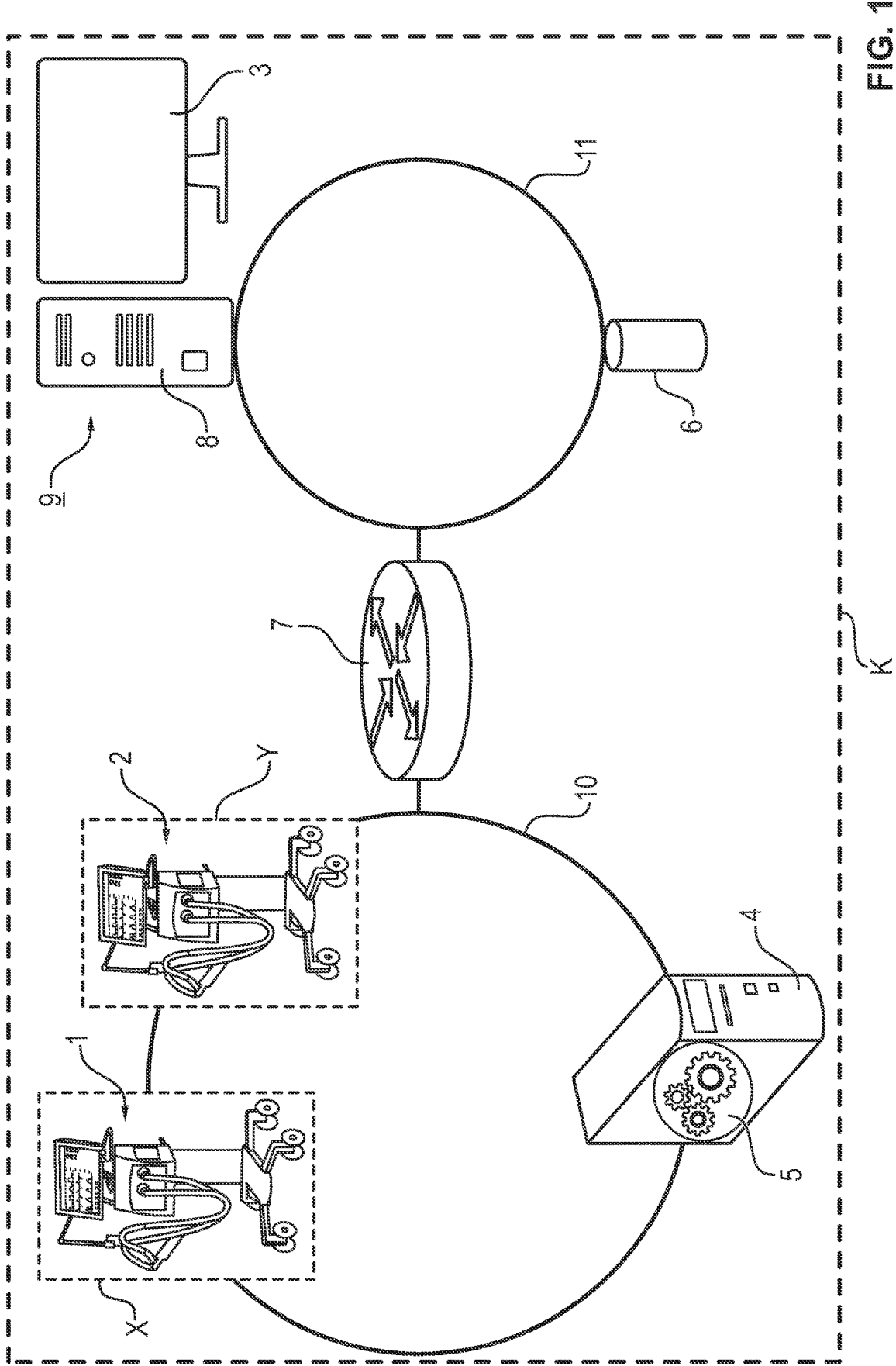
FIG. 1 is a schematic view showing the arrangement with two interconnected data networks (a network configuration)

FIG. 1 shows a simple arrangement in which a data network configuration comprises two data networks 10 and 11 interconnected via a router 7. The router 7 allows a message to pass from one data network 10, 11 to the other data network 11, 10 only if this message meets certain predefined criteria, in particular if it is compatible with at least one of several predefined transmission protocols. The router 7 separates the two data networks 10 and 11 from each other, which increases data security, and yet data communication is possible between a device in one data network 10, 11 and a device in the other data network 11, 10, preferably in both directions.

A communications computer (communications device) 4 and at least temporarily two ventilators 1 and 2 are connected to the data network 10. The communications computer comprises a processing unit with one or more data processor and memory. Each ventilator 1, 2 can be connected to one patient each and is capable of artificially ventilating and optionally anesthetizing this patient. The ventilator 1 is located in a room X, the ventilator 2 in another room Y of the hospital. Each ventilator 1, 2 collects data, in particular vital signs of the connected patient and operating parameters during artificial ventilation. Each ventilator 1, 2 is therefore a provider.

A central display unit 9 with a computer 8 and a screen 3 as well as a data memory 6 are connected to the data network 11. The display device 9 is capable of processing data collected by a ventilator 1, 2 or other medical device and displaying the result of the processing on its screen 3. Processing may include the step of preparing measured values. The data from a ventilator 1, 2 can also be stored in the data memory 6. The display unit 9 and the data memory 6 are therefore consumers.

Note: In the example shown, the providers are connected to the data network 10, and the consumers are connected to the data network 11. It is also possible that at least one provider and at least one consumer are connected to the same data network.

Each provider 1, 2, consumer 6, 9 and other data processing device 4 has a unique network address. This network address distinguishes that device from any other device connected or connectable to one of the data networks 10 or 11. A message to a device can be transmitted using that device's network address and then reach that device. Each device is able to determine whether or not a message is directed to that device based on the network address.

A consumer 9, 6 in the data network 11 sends a request for data. For example, the request specifies that certain data is to be provided by a ventilator of a type Bg1 or a type Bg2 in space X. The embodiment example described below refers to the case where a request specifies a device type and a location of the provider, in this case Bg1 or Bg2 and room X, i.e., a location-based request. It is also possible that a request specifies the device type as well as an associated patient. So this request specifies the device type Bg1 or Bg2 and a unique identifier of the patient, where this identifier distinguishes the patient from all other patients in the hospital. This is a patient-based request. A patient-based request does not require knowledge of which room or bed this patient is currently in. The request remains valid even if the patient is moved or transferred from one room to another.

A request message containing this request is transmitted into the data network 10. A provider 1, 2 in the data network 10 is able to provide requested data for a data transmission. The router 7 enables 1:1 communication between a consumer 9, 6 in the data network 11 and a provider 1, 2 in the data network 10. However, this 1:1 communication requires that the requesting consumer 9, 6 knows the network address of a matching provider 1, 2 or a matching provider 1, 2 knows the network address of the requesting consumer 9, 6. A communications agent conveys to a consumer 9, 6 the address data necessary for the consumer 9, 6 to request data from a provider 1, 2. Or the communications agent provides a provider 1, 2 with the necessary address data to transmit requested data to the consumer 9, 6.

A data-processing communications agent has become known by the terms "proxy" and "proxy server". Therefore, the term "proxy" is also used in the following. The proxy 5 is preferably a software program that runs on the computer 4 in the embodiment example (the proxy 5 is a software program on a non-transient, tangible medium or media (memory) with a program code executable on the one or more processors of the computer device 4). The proxy 5 can exchange messages with devices connected to a data network 10 or 11. The proxy 5 also has a unique network address. Any other data processing device 1, 2, 7, 6, 9 connected or connectable to a data network 10 or 11 "knows" the network address of the proxy 5.

Figure 2:
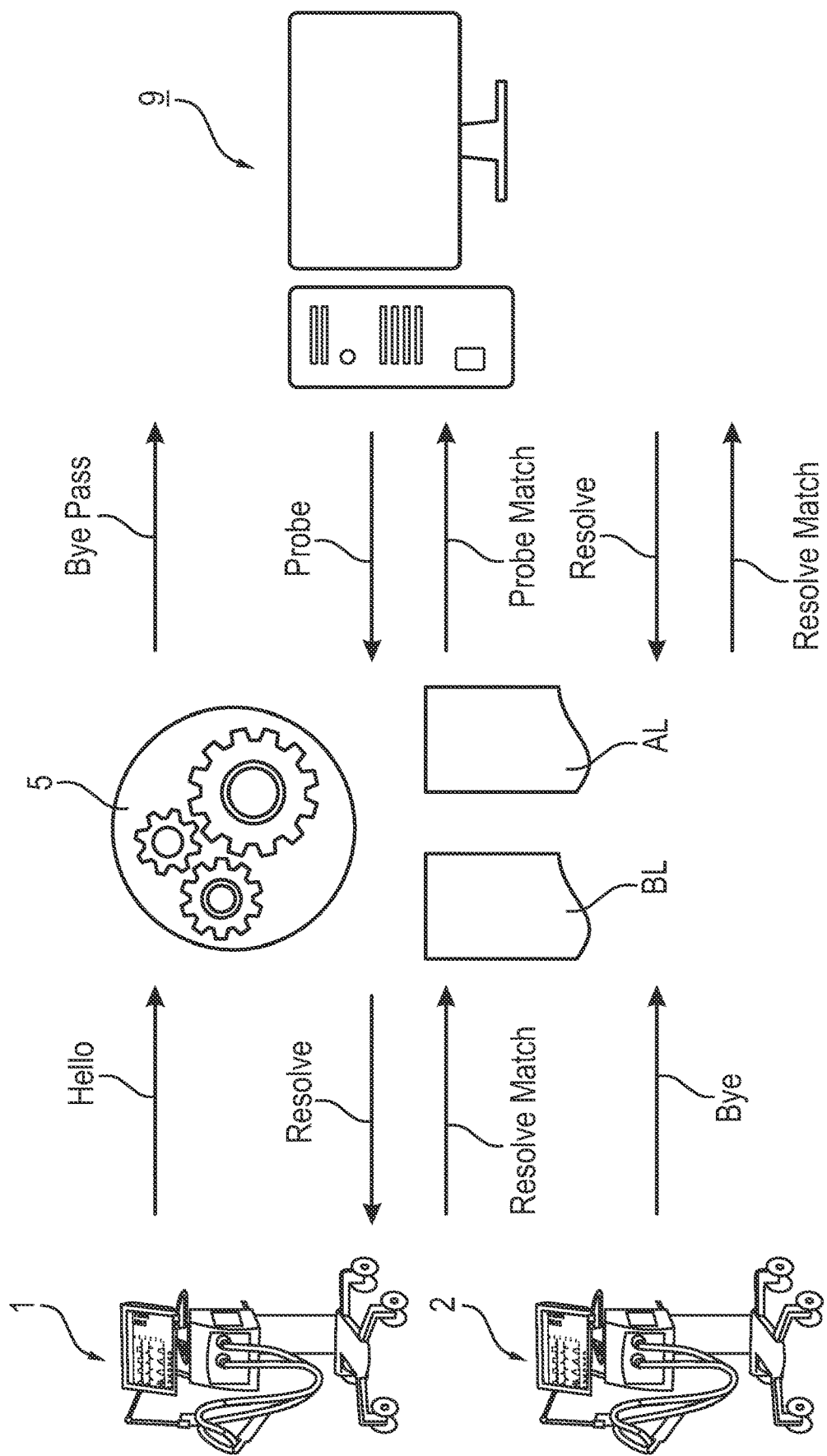
FIG. 2 is a schematic view showing messages being exchanged between a provider and a consumer.

FIG. 2 shows schematically which messages can be exchanged between a provider, a consumer and the proxy 5 in the embodiment example. Some of the names shown in FIG. 2 correspond to those used in the OASIS Web Services Dynamic Discovery (WS-Discovery) Version 1.1 standard. These messages help to set up a data transfer from a provider to a consumer. Any message that is transmitted to set up a data connection is transmitted to or from the proxy 5, i.e. not directly from a provider to a consumer or vice versa.

Ventilators 1 and 2 are shown as examples of the providers, and the display unit 9 is shown as an example of the consumer. The proxy 5 maintains two lists in computer-interpretable form, namely a providers list BL and a requests list AL, i.e. the proxy 5 has read and write access to these lists AL and BL, which are stored in a data memory. The providers list BL contains one entry for each provider that is currently in a data connection with the proxy 5. The requests list AL includes one entry for each request that a consumer has sent to the proxy 5, but preferably only for a specific time period. This is explained further below.

Upon a provider, for example, ventilator 1 or ventilator 2, being connected to a data network and/or powered on (switched on), provider 1, 2 sends a registration (login) message ("Hello") to proxy 5. This registration (login) message contains information about provider 1, 2, for example, the type and network address of the device, and an identification of the current location of the device in the hospital. In the present example, the provider 1 is a ventilator located in room X, and the provider 2 is a ventilator located in room Y. After receiving a corresponding registration message, the proxy 5 adds an entry for the ventilator 1, 2 to the providers list BL.

In the embodiment example, the proxy 5 sends a status request ("Resolve") periodically, for example every n seconds, to each provider registered in the providers list BL, i.e. also to the ventilators 1 and 2. If a requested provider 1, 2 is still on the data network 10, the provider 1, 2 transmits a status response ("Resolve Match") to the proxy 5. If the proxy 5 has transmitted n status requests to a provider 1, 2 registered in the providers list BL (n>=1) and the requested provider 1, 2 does not respond to at least one status request within a predefined response time period, the proxy 5 deletes the entry for this provider 1, 2 in the providers list BL.

A provider 1, 2 may also transmit an unsubscribe (logoff) message ("bye") to the proxy 5, for example in response to the provider 1, 2 being turned off (shut down) and/or disconnected from the data network 10. In response to receiving an unsubscribe (logoff) message, the proxy 5 deletes the entry for this provider 1 in the providers list BL.

A consumer, such as the display device 9, transmits a request message ("probe") to the proxy 5. This request message specifies what data is to be transmitted to the consumer 9. For example, the request message specifies that data from a ventilator in room X is needed. In response, the proxy 5 transmits a mediation message ("probe match") to the requesting consumer 9—provided that the providers list BL contains an entry that matches the request message, or a matching registration message reaches the proxy 5. In the example just given, the entry for the ventilator 1 matches this request message. The provider message includes the necessary address data of the ventilator 1, in particular its unique network address. If no entry in the providers list BL matches the received request message, the proxy 5 transmits no message at all or an error indication (nil) message to the requesting consumer 9.

It is possible that a consumer 9 that has received a mediation message has a request for that mediation message. For example, the consumer 9 has selected at least one provider 1 from among several providers mentioned in the mediation message and still needs further information about the selected provider or each selected provider 1 in order to subsequently request the requested data directly from the provider 1. In this case, the consumer 9 transmits a query message ("Resolve") to the proxy 5. The proxy 5 transmits a query response ("Resolve Match") to this consumer 9 in response.

In response to the proxy 5 receiving a request message ("Probe"), the proxy 5 adds an entry for this request message to the requests list AL. This entry in the requests list AL contains the specification contained in the request message, i.e., a specification of what data is required according to the request message, and a timestamp that identifies a point in time. For example, at this point in time, this request message has arrived at the proxy 5. Preferably, the proxy 5 deletes the entry for this request message from the requests list AL again when a predetermined storage period of, for example, 30 minutes has elapsed since the time stamp.

It is possible that first a request message ("Probe") from a consumer 9 and then a registration (login) message ("Hello") arrive at the proxy 5, wherein the provider 1 that logs in to the proxy 5 with the registration message provides data and wherein the consumer 9 requests this data according to the request message. The proxy 5, in response to the proxy 5 receiving a registration message, searches the requests list AL for entries for requests that match the registration message. Thus, if the display device 9 first transmitted a request message to the proxy 5 that the display device 9 requests data from a ventilator in room X, and then the ventilator 1 transmitted a registration message to the proxy 5 specifying the type and current location (room X) of the ventilator 1, the proxy 5 detects that the ventilator 1 matches the registered request in the requests list AL according to this registration message. The proxy 5 forwards a registration message ("Hello") via the provider 1 to the consumer 9 from which this registered request message originated. It is possible that multiple registration messages match the same request message and/or multiple request messages match the same registration message.

Accordingly, the proxy 5 responds when the proxy 5 has received an unsubscribe (logoff) message ("Bye") from a provider 1 and the provider 1 that transmitted this unsubscribe message matches a request message in the requests list AL. The proxy 5 forwards an unsubscribe message ("Bye Pass") to the consumer 9 via the provider 1. In one embodiment, the proxy 5 also forwards a unsubscribe message ("Bye Pass") to the consumer 9 via the provider 1 if that provider 1 has not responded to a status request ("Resolve") from the proxy 5 within the predetermined response time period.

In the embodiment, each registration (login) message, each unsubscribe (logout) message, each request message, and each mediation message is transmitted using a transmission protocol that provides a high level of data security, in the embodiment using the TCP HTTPS protocol and/or using "Transport Layer Security" (TLS). A status request and a status response are not necessarily transmitted using this secure transmission protocol in order to save time and computing capacity.

FIG. 3 to FIG. 8 illustrate examples of different situations when establishing a data transmission.

FIG. 3 shows how a provider, in this case the ventilator 1, registers with (logs on) to the proxy 5. The provider 1 transmits a first registration message ("Hello 1") to the proxy 5. In response to the receipt of the first registration message, the proxy 5 adds an entry 20 for the ventilator 1 to the providers list BL. This entry 20 includes information about the type (Bg1), the current network address (xyz) and the current location (room X) of the ventilator 1. The type Bg1 and the current location X belong to the provider specification of the entry 20.

Furthermore, it can be seen in FIG. 3 that the proxy 5 periodically, for example every 5 seconds, transmits a status request to each provider noted in the providers list BL. Therefore, the proxy 5 also transmits a status request ("Resolve 1") also to the ventilator 1. As long as the ventilator 1 is connected to the data network 10, the ventilator 1 sends a status response ("Resolve Match 1") to the proxy 5. If this status response is missing, the proxy 5 deletes the ventilator 1 from the providers list BL.

In the situation shown in FIG. 4, a consumer, in this case the display device 9, transmits a first request message ("Probe 1") for data to the proxy 5. The first request message contains a request for data from a ventilator of type Bg1 or of type Bg2 in room X and contains the network address (abc) of the requesting consumer 9. The specification Bg 1/2 for the type and the specification for room X belong to the data specification of this first request message.

In response to receiving the first request message, the proxy 5 searches the providers list BL, looking for any entry with a provider specification that matches the data specification in the received first request message. The proxy 5 determines that the provider specification in the entry 20 for the ventilator 1 matches the data specification in the received first request message ("probe 1") from the consumer 9. The proxy 5 generates a first match message ("Probe Match 1") comprising the network address (xyz) and optionally other information about the ventilator 1, for example the type Bg1, and triggers the step of transmitting the first match message ("Probe Match 1") to the consumer 9. In the example shown, the data transmitted in the first mediation message is sufficient for the consumer 9 to initiate 1:1 communication with the provider 1 using the received unique network address (xyz).

In the embodiment example, the proxy 5 periodically transmits a status request to each provider noted in the providers list BL and checks whether a status response arrives. In contrast, in the embodiment example, the proxy 5 does not transmit a status request to a consumer. This saves messages. It is therefore possible that the consumer 9, to which a mediation message has been transmitted, is currently no longer connected to the data network 11.

In addition, the proxy 5 adds an entry 30 to the requests list AL for the "first request message" ("probe 1") from the display device 9. This entry 30 includes the network address (abc) of the requesting consumer 9, a timestamp (10:05), and the data specification of the first request message, i.e., information that data is needed from a type Bg1 or type Bg2 ventilator in space X.

In the example shown, the entry 30 in the requests list AL further includes the network address (xyz) of the provider 1, which the proxy 5 transmitted to the requesting consumer 9 as part of the first mediation message. Of course, this is only true if a matching registration message and thus a matching provider are found.

The entry 30 for the first request message from the consumer 9 is left in the requests list AL for the storage period of, for example, 30 minutes and then deleted again by the proxy 5.

Figure 5:
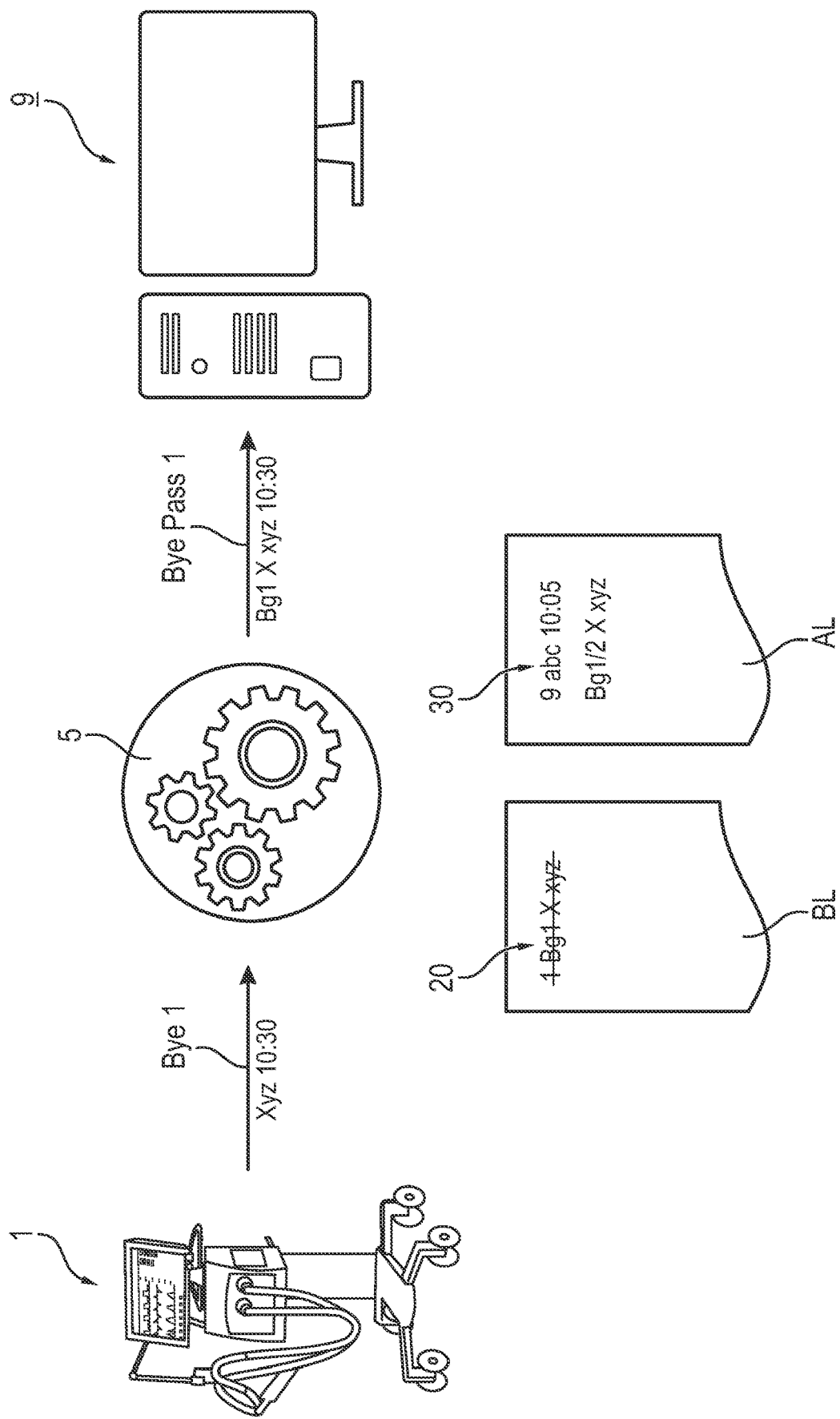
FIG. 5 is a schematic view showing how the first provider unsubscribes (logs out) from the proxy and how, based on an entry in the requests list, the proxy forwards this logout to the consumer.

FIG. 5 illustrates that the ventilator 1 transmits an unsubscribe (logoff) message ("Bye 1") to the proxy 5. For example, the ventilator 1 is shut down and then turned off because an artificial ventilation performed by the ventilator 1 has ended. The proxy 5 then deletes the entry 20 for the provider 1 from the providers list BL.

This logoff (unsubscribe) message arrives at the proxy 5 within this storage period, for example at 10:25. Therefore, the requests list AL still includes the entry 30 for the first request message from the consumer 9. This entry 30 includes the network address (abc) of the requesting consumer 9 and, in one embodiment, as assignment information, the network address (xyz) of the provider 1 that the proxy 5 transmitted to the consumer 9 as part of the mediation message.

The proxy 5 determines that the unsubscribe message originates from the device 1 referred to in the mediation message that the proxy 5 previously transmitted to the requesting consumer 9 in response to the request message. The proxy 5 therefore now transmits a unsubscribe message ("Bye Pass 1") to the consumer 9, using the network address (abc) of the consumer 9 as the destination address for the unsubscribe message and the network address (xyz) of the now disconnected ventilator 1 as a content of the unsubscribe message. The proxy 5 deletes the entry 30 from the requests list AL.

In one embodiment, the logoff (unsubscribe) message from the ventilator 1 includes a time period until the end of which the ventilator 1 is still connected to the data network 10, or a time from which the ventilator 1 is no longer connected to the data network 10, for example, the time 10:30. The unsubscribe message transmitted to the consumer 9 includes this time period or time. The consumer 9 may use the received information about the time period or time point to terminate the data communication with the provider 1 in an orderly manner.

In the example of FIG. 6, the display device 9 has transmitted a second request message ("Probe 2") to the proxy 5. Also according to the second request message, data is needed from a ventilator of type Bg1 or type Bg2, but this time from a ventilator in room Y rather than room X. The proxy 5 determines that there is currently no matching entry in the providers list BL, i.e., no entry about an active ventilator of type Bg1 or of type Bg2 in room Y. The proxy 5 determines that there is currently no entry in the providers list BL. In one realization form, the proxy 5 transmits a message ("Probe Match 0") with a corresponding error indication to the requesting consumer 9. In another implementation, the proxy 5 does not transmit a message to the requesting consumer 9.

In addition, the proxy 5 adds an entry 31 to the requests list AL for this second request message, i.e., an entry for a request related to a ventilator of type Bg1 or type Bg2 in room Y. The proxy 5 also adds an entry 31 for the second request message. This entry 31 again includes the network address (abc) of the requesting consumer 9 and a timestamp 11:11, and also the data specification, namely type Bg 1/2 and space Y. The entry 31 for the second request message does not include a network address of a provider because no matching provider is currently connected to a data network 10 or 11.

Figure 7:
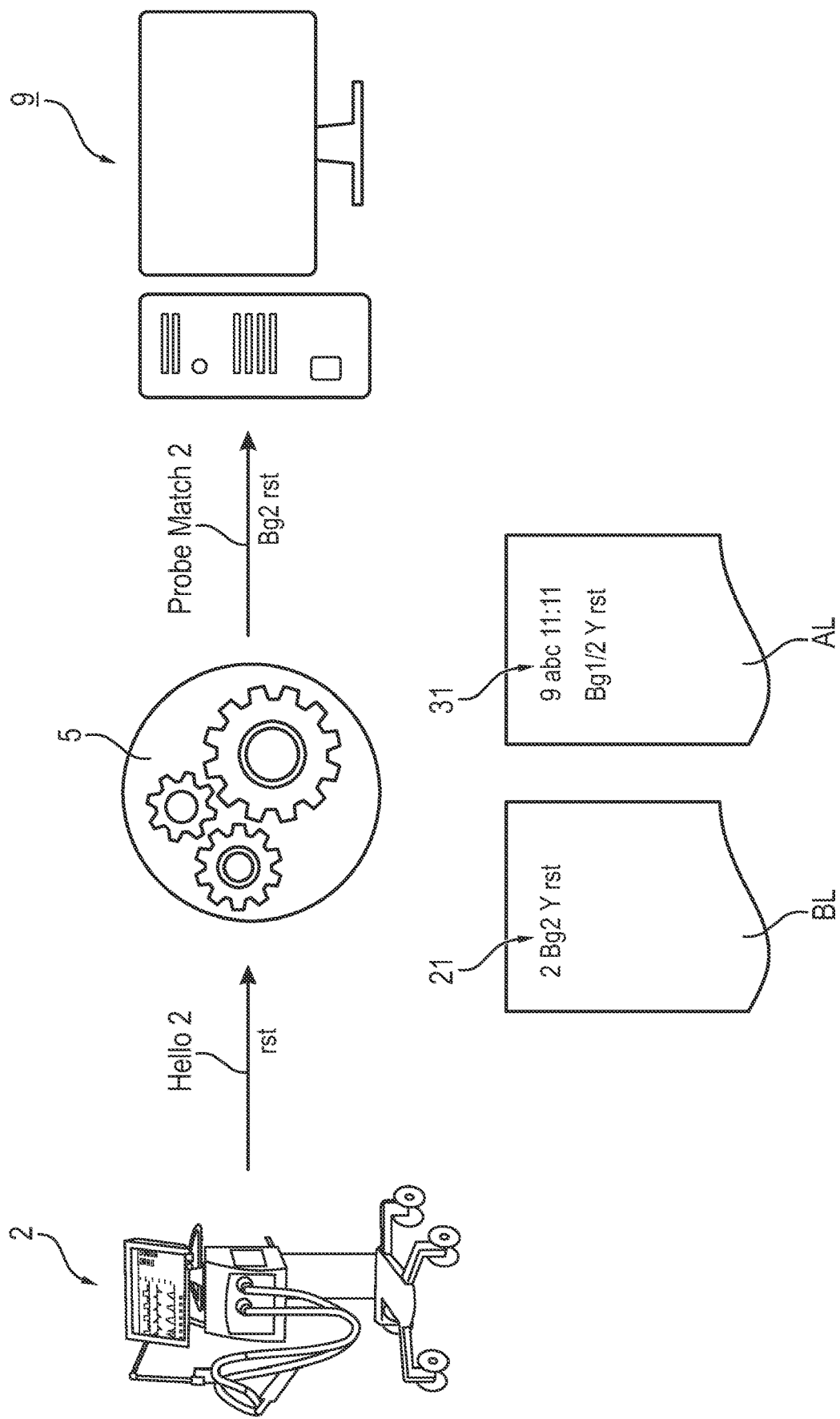
FIG. 7 is a schematic view showing how a second provider logs in to the proxy and how the proxy then searches the requests list, finds a matching entry in the requests list, and delivers a mediation message to the consumer.

As FIG. 7 shows, a registration (login) message ("Hello 2") later arrives at the proxy 5 from the ventilator 2 in room Y. The proxy 5 receives the registration message. This registration message contains a provider specification, which includes the information that the ventilator 2 is of type Bg2 and is currently located in room Y, and also the network address (rst) of the ventilator 2. The proxy 5 adds a corresponding entry 21 for the ventilator 2 to the providers list BL. Periodically, the proxy 5 transmits a status request to the ventilator 2 and checks whether a status response arrives from the ventilator 2 in time. This is not shown in FIG. 7.

The login (registration) message from the ventilator 2 arrives within the storage time period for the second request message from the consumer 9, for example, at 11:20. The proxy 5 determines that the provider specification in entry 21, generated as a result of the registration message from the ventilator 2, matches the data specification of the received second request message and that the second request message has not yet been matched. Therefore, the proxy 5 generates a mediation message ("Probe Match 2") for the second request message ("Probe 2"). This mediation message includes the type Bg2 and the network address (rst) of the ventilator 2. The proxy 5 transmits this mediation message to the requesting consumer 9. In addition, the proxy 5 adds the network address (rst) of the matching provider 2 to the entry 31 that was generated in the requests list AL in response to receiving the second request message.

Figure 8:
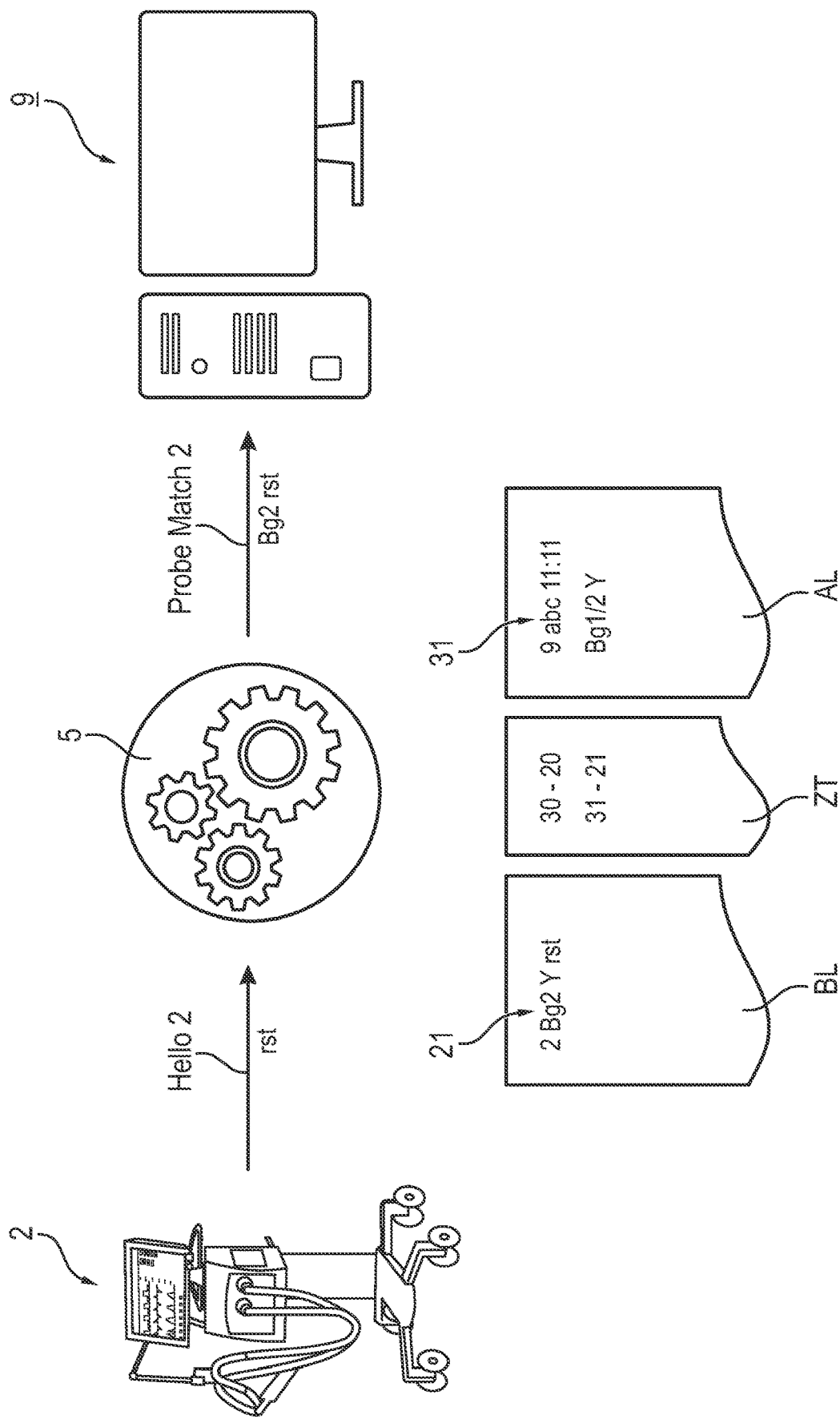
FIG. 8 is a schematic view showing a variation of the embodiment according to FIG. 7, in which an assignment table is additionally used.

As shown in FIG. 4, the entry 30 for the first request message is supplemented with the network address (xyz) of the provider 1 whose provider specification matches the data specification in the first request message. FIG. 7 shows that the entry 31 for the second request message and the network address (rst) of the provider 2 is added. FIG. 8 shows a modification to the example shown in FIG. 7. The proxy 5 additionally has read and write access to a computer-evaluable allocation table ZT. This assignment table ZT contains one row for each request message in the requests list AL for which the proxy 5 has found a provider 1, 2 with a matching provider specification in the providers list BL. This line includes the entry in the requests list AL and the matching entry in the providers list BL. In the example of FIG. 8, the two lines 30-20 (first request message) and 31-21 (second request message) are shown.

It is also possible that no allocation information is stored at all, i.e. neither as shown in FIG. 4 and FIG. 7 nor as shown in FIG. 8.

In the process just described with reference to FIG. 3 to FIG. 8, the proxy 5 transmits to the consumer 9 the respective network address (xyz) or (rst) of a provider 1 or 2 that is able to provide data matching the respective data specification of the consumer 9. The consumer 9 then requests the requested data from the provider 1 or 2 whose network address (xyz) or (rst) has been transmitted to the consumer. It is also possible that the proxy 5 transmits the network address (abc) of the consumer 9 to the provider 1 or 2 if the provider specification of the provider 1 or 2 matches the respective data specification of the consumer 9. The provider 1 or 2 then transmits the requested data to the consumer 9 whose network address (abc) has been transmitted to the provider 1 or 2.

In the examples described so far, a mediation message is transmitted to a device 9, 1, 2, which directly comprises the network address of another device 1, 2, 9. It is also possible that the devices 1, 2, 9 have at least temporary read access to an address table. This address table is secured against unauthorized read access and comprises one entry for each device that is connected or connectable to the data network configuration 10, 11. The address table only needs to be changed if a device is connected to the data network configuration 10, 11 for the first time or if a device is permanently removed from the data network configuration 10, 11 or if the network address of a device is changed. The address table does not need to be changed if a device is only temporarily switched off.

The entry in the address table for a device includes the network address and a unique identifier for this device. A mediation message is also transmitted to a consumer 9 or to a provider 1, 2. This mediation message comprises the unique identifier of the provider 1, 2 or the consumer 9. The consumer 9 or the provider 1, 2 determines the network address of the provider 1, 2 or the consumer 9 by reading the address table.

In the sequence shown so far, each data specification in a request message matches exactly one provider specification transmitted to the proxy 5 as part of a registration message.

It is possible for a data specification to match multiple provider specifications from multiple providers. In one embodiment, the proxy 5 then transmits the respective network address of each matching provider to the requesting consumer. The entry that the proxy 5 generates in the requests list AL for this request message then preferably comprises multiple network addresses, namely the respective network address of each matching provider.

It is also possible that the same provider specification matches multiple data specifications, where the proxy 5 has received that provider specification as part of multiple request messages from different consumers. In this case, the proxy 5 preferentially transmits the same network address to the different consumers. The proxy 5 adds the same network address of this provider to each entry in the requests list AL.

In summary, the invention relates to a process and device (computer) for automatically establishing a data transfer, namely a data transfer from a provider 1, 2 that provides data to a consumer 9 that uses the data. A consumer 9 transmits a request message ("probe") for requested data to a communications agent 5. In response to receiving the request message, the communications agent 5 adds an entry for the request message ("probe") to a requests list AL, regardless of whether a provider capable of providing the requested data is available. Subsequently, a provider 1, 2 transmits a registration (login) message ("Hello") to the communications agent 5. The communications agent 5 searches the requests list AL for an entry for a request message ("Probe") that matches the received registration message ("Hello"). If a matching entry is found in the requests list AL, the communications agent 5 initiates a data transfer from the provider 1, 2 to the consumer 9.

While specific embodiments of the invention have been shown and described in detail to illustrate the application of the principles of the invention, it will be understood that the invention may be embodied otherwise without departing from such principles.

LIST OF REFERENCE SIGNS

| | |
|---|---|
| 1 | Ventilator in room X, connected to data network 10, type Bg1, has network address xyz, operates as a provider |
| 2 | Ventilator in room Y, connected to data network 10, type Bg2, has network address rst, operates as a provider |
| 3 | Display device screen 9 |
| 4 | Communication computer (communications device), on which the proxy 5 runs, connected to the data network 10 |
| 5 | Proxy running on the communication computer 4 and therefore connected to the data network 10 has read and write access to the providers list BL and to the requests list AL and keeps these two lists BL, AL up to date, operates as the communications agent |
| 6 | Data storage device, connected to the data network 11, operates as a consumer |
| 7 | Router interconnecting the data networks 10 and 11 |
| 8 | Display device computer 8 |
| 9 | Display device, includes computer 8 and screen 3, connected to data network 11, has network address abc, operates as a consumer |
| 10 | Data network to which the ventilators 1 and 2 and the communication computer 4 are connected, connected to the data network 11 via the router 7. |
| 11 | Data network, to which the display device 9 and the data storage device 6 are connected, is connected to the data network 10 via the router 7. |
| 20 | Entry in the BL providers list for ventilator 1, generated due to the first registration message, deleted after receipt of the unsubscribe message. |
| 21 | Entry in the BL providers list for ventilator 2, generated due to the second registration message. |
| 30 | Entry in the requests list AL for the first request message, matches entry 20 |
| 31 | Entry in the requests list AL for the second request message, matches entry 21 |
| AL | Requests list, in which one entry is added for each request message to the proxy 5, whereby this entry is deleted again after the storage period has expired, comprises the entries 30 and 31 |
| BL | Providers list, in which one entry is entered for each connected provider (each registration message from a provider), includes entries 20 and 21 |
| Bye 1 | Logoff (unsubscribe) message from provider 1, transmitted to proxy 5. |
| Bye Pass 1 | Logoff (unsubscribe) message forwarded to consumer 9 from provider 1 |
| Hello 1 | first login (registration) message, originates from provider 1, causes entry 20 |
| Hello 2 | second login (registration) message, originates from provider 2, causes entry 21 |
| Probe 1 | first request message, originates from consumer 9, causes entry 30 |
| Probe 2 | second request message, originates from consumer 9, causes entry 31 |
| Resolve 1 | first mediation message, to consumer 9, specifies ventilator 1 as the appropriate provider |
| Resolve 2 | second mediation message, to the consumer 9, specifies the ventilator 2 as the appropriate provider |
| X | Room in which the ventilator 1 is currently located |
| Y | Room in which the ventilator 2 is currently located |
| ZT | Allocation table, includes one entry for each initiated data transfer from a provider to a consumer |

What is claimed is:

1. A process for automatically establishing a data transmission in an arrangement with a data network configuration comprising one or more data networks over which data messages are transmittable, wherein at least one data processing device is connected or at least temporarily connectable to the network configuration, wherein at least one device connected or connectable to the data network configuration is a medical device and is a provider and operates at least temporarily as a data provider and at least one device connected or connectable to the data network is a consumer and operates at least temporarily as a data consumer, wherein each connected or connectable device has a respective unique network address that distinguishes this device from any other connected or connectable device, the process comprising the steps of:
providing a communications agent with a unique network address;
providing a computer-evaluable requests list;
transmitting a request message for requested data from the consumer to the communications agent, wherein the request message comprises a data specification of the requested data and the network address of the consumer from which the request message originates;
with the communications agent, adding an entry for the transmitted request message to the requests list in response to the receipt of the request message, said entry comprising the transmitted data specification and the transmitted consumer's network address;
transmitting a registration message from the provider to the communications agent, said registration message comprising a provider specification specifying the provider, the network address of said provider, and information that said provider is currently connected to the network configuration,
with the communications agent, in response to the reception of the registration message, searching the requests list for at least one entry comprising the data specification that matches the provider specification transmitted as a part of the received registration message;
upon the communications agent finding at least one entry in the requests list comprising the data specification that matches the provider specification in the received registration message, with the communications agent, triggering at least one of:
transmitting a mediation message to the consumer from which the matching request message originates, said mediation message comprising the network address of the provider from which the received matching registration message originates; and
transmitting a mediation message to the provider from which the received matching registration message originates, said mediation message comprising the network address of the consumer from which the matching request message originates.

2. The process according to claim 1, wherein:
at least once the communications agent first receives the request message and subsequently receives the registration message; and/or
at least once the communications agent first receives the registration message and subsequently receives the request message; and wherein the communications agent adds the entry for the request message to the requests list in response to the receipt of the request message both with the communications agent first receiving the request message and then receiving the registration message and with the communications agent first receiving the registration message and then receiving the request message.

3. The process according to claim 1, further comprising:
providing a computer-evaluable providers list;
with the communications agent, adding an entry for the provider to the providers list in response to receiving a registration message from the provider, said entry comprising the transmitted provider's network address and the transmitted provider specification;
with the communications agent, in response to the receipt of the request message, searching the providers list for at least one entry with provider specification matching requested data transmitted as a part of the request message;
with the communications agent, upon the communications agent finding an entry in the providers list with provider specification matching requested data in the request message, triggering at least one of:
transmitting a mediation message to the consumer from which the matching request message originates, said mediation message comprising the network address of the provider to which the matching entry in the providers list belongs; and
transmitting a mediation message to the provider to which the matching entry in the providers list belongs, said mediation message comprising the network address of the consumer from which the matching request message originates.

4. The process according to claim 1, further comprising
transmitting an unsubscribe message from the provider to the communications agent, wherein said unsubscribe message comprises a network address of said provider and information that said provider is now no longer connected to the data network configuration;
with the communications agent, in response to receipt of the unsubscribe message, searching for the consumer from which at least one request message originates for which there is an entry in the requests list; and
with the communications agent, upon finding the consumer, triggering transmitting to the consumer found the unsubscribe message from the provider, wherein the unsubscribe message transmitted to the consumer comprises the network address of the provider.

5. The process according to claim 4, wherein:
upon the communications agent finding an entry in the requests list matching the registration message or finding an entry in the providers list matching the request message, storing assignment information from which provider the provider specification matching the matching request message originates; and
the communications agent, in response to the receipt of the unsubscribe message, searches in the stored assignment information for each request message with data specification that matches the provider specification of the provider from which the unsubscribe message originates;
the communications agent searches in the requests list for each consumer from which a matching request message originates; and
the communications agent triggers transmitting to each consumer found an unsubscribe message.

6. The process according to claim 1, further comprising providing a given storage period,
wherein the entry which the communications agent adds to the requests list in response to the receipt of a request message additionally comprises at least one timestamp, wherein the timestamp comprises at least one of:
a time at which the communications agent received this request message; and
a time at which the communications agent triggered the transmission of the mediation message, and
wherein the communications agent deletes the entry from the requests list at the latest when the given storage period has elapsed since the time indicated by the time stamp.

7. The process according to claim 1, wherein:
the step of transmitting to the consumer the mediation message with the network address of the provider triggers the consumer to request data from the provider using the transmitted network address of the provider; and
the step of transmitting to the provider the mediation message with the network address of the consumer triggers the provider to transmit data to the consumer using the transmitted network address of the consumer.

8. The process according to claim 1,
wherein the provider comprises a medical device that is connected or connectable to a patient or wherein the provider comprises a medical resource device that is configured to provide a resource for a medical device; and
wherein the consumer comprises a device configured to process data from at least one of the medical device and the medical resource device or comprises a device configured to output received data in a form that can be perceived by a human.

9. The process according to claim 1, wherein the respective data specification of a request message comprises at least one of:
a specification of a location where a provider of the requested data is expected to be located; and
a specification of a living being or a further device to which the provider of the requested data is expected to be connected; and
a designation of a measurable physical quantity; and
the respective provider specification of a registration message comprises at least one of:
a specification of a location where the provider from which the registration message originates is currently located; and
a specification of a living being or a further device to which the provider is currently connected; and
a designation of a measurable physical quantity.

10. The process according to claim 1,
wherein the arrangement with the data network configuration is at or is associated with a hospital,
wherein the provider is configured to at least one of:
perform a medical treatment of a patient; and
measure a vital sign of a patient; and
provide a resource needed to treat a patient, and
wherein the consumer is configured to at least one of:
output received data in a form that can be perceived by a human being; and
process received data.

11. The process according to claim 1, further comprising providing a computer program configured to be executable on a computer with a processor, wherein upon executing the computer program on the processor of the computer, the computer carries out the or at least some of the process steps performed by the communications agent.

12. A computing device configured to establish at least one data transmission in an arrangement, said arrangement comprising a data network configuration comprising at least one data network in which messages are transmittable, wherein at least one data processing device is connected to or at least temporarily connectable to the network configuration, wherein at least one device connected to or connectable to the data network configuration is a medical device and is a provider and operates at least temporarily as a data provider and at least one device connected to or connectable to the data network configuration is a data consumer and operates at least temporarily as a consumer of data, wherein each connected or connectable device has a respective unique network address that distinguishes this device from any other connected or connectable device, wherein, data is transferable from the provider to the consumer after data transfer has been established, the computing device comprising:
a processing unit; and
a communications agent with a unique network address, wherein the computing device is configured to:
have at least intermittent read and write access to a computer-evaluable requests list;
with the communications agent, receive a request message for requested data from the consumer, wherein the request message comprises a specification of the requested data and the network address of the consumer from which the request message originates;
with the communications agent, add an entry for the request message to the requests list in response to the receipt of the request message, said entry comprising the transmitted data specification and the transmitted consumer's network address;
with the communications agent, receive a registration message from the provider, said registration message comprising a specification specifying said provider, the network address of said provider, and information that said provider is now connected to the network configuration;
with the communications agent, in response to the reception of the registration message, search in the requests list for at least one entry with data specification that matches the provider specification transmitted as a part of the received registration message;
with the communications agent, upon finding at least one entry in the requests list having the data specification that matches the provider specification in the received registration message, triggering at least one of:
transmitting a mediation message to the consumer from which the matching request message originates, said mediation message comprising the network address of the provider from which the received matching registration message originates; and
transmitting a mediation message to the provider from which the matching registration message originates, said mediation message comprising the network address of the consumer from which the matching request message originates.

13. The computing device according to claim 12, wherein the communications agent comprises a software program on a non-transient, tangible medium or media with a program code executable on the processing unit of the device.

14. A system comprising:
a data network configuration comprising at least one data network in which messages are transmittable, wherein at least one data processing device is connected to or at least temporarily connectable to the network configuration, wherein at least one device connected to or connectable to the data network configuration is a medical device and is a provider and operates at least temporarily as a provider of data and at least one device connected to or connectable to the data network configuration is a consumer and operates at least temporarily as a consumer of data, wherein each connected or connectable device has a respective unique network address that distinguishes same from any other connected or connectable device; and
a computing device comprising:
a processing unit and; and
a communications agent with a unique network address, wherein the computing device is configured to:
have at least intermittent read and write access to a computer-evaluable requests list;
with the communications agent, receive a request message for requested data from the consumer, wherein the request message comprises a specification of the requested data and the network address of the consumer from which the request message originates;
with the communications agent, add an entry for the request message to the requests list in response to the receipt of the request message, said entry comprising the transmitted data specification and the transmitted consumer's network address;
with the communications agent, receive a registration message from the provider, said registration message comprising a specification specifying said provider, the network address of said provider, and information that said provider is now connected to the network configuration;
with the communications agent, in response to the reception of the registration message, search in the requests list for at least one entry with data specification that matches the provider specification transmitted as part of the received registration message;
with the communications agent, upon finding at least one entry in the requests list having the data specification that matches the provider specification in the received registration message, triggering at least one of:
transmitting a mediation message to the consumer from which the matching request message originates, said mediation message comprising the network address of the provider from which the received matching registration message originates; and
transmitting a mediation message to the provider from which the matching registration message originates, said mediation message comprising the network address of the consumer from which the matching request message originates.

15. The system according to claim 14, wherein the communications agent comprises a software program on a non-transient, tangible medium or media of the computing device or with which the processor of the device has read and write access, the software program comprising a program code executable on the processor of the computing device.

* * * * *